United States Patent
Kumano (10) Patent No.: US 10,435,090 B2
(45) Date of Patent: Oct. 8, 2019

(54) ELASTIC CRAWLER

(71) Applicant: BRIDGESTONE CORPORATION, Chuo-ku, Tokyo (JP)

(72) Inventor: Youichi Kumano, Yokohama (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 0 days.

(21) Appl. No.: 15/741,767

(22) PCT Filed: Jul. 28, 2016

(86) PCT No.: PCT/JP2016/003496
§ 371 (c)(1),
(2) Date: Jan. 4, 2018

(87) PCT Pub. No.: WO2017/017958
PCT Pub. Date: Feb. 2, 2017

(65) Prior Publication Data
US 2018/0201334 A1    Jul. 19, 2018

(30) Foreign Application Priority Data
Jul. 30, 2015  (JP) .................................. 2015-151244

(51) Int. Cl.
*B62D 55/24* (2006.01)
*B62D 55/253* (2006.01)
*B62D 55/26* (2006.01)

(52) U.S. Cl.
CPC ......... *B62D 55/244* (2013.01); *B62D 55/253* (2013.01); *B62D 55/26* (2013.01)

(58) Field of Classification Search
CPC .. B62D 55/244; B62D 55/253; B62D 55/125; B62D 55/14

(Continued)

(56) References Cited

U.S. PATENT DOCUMENTS

| 6,170,925 B1* | 1/2001 | Ono | B62D 55/24 305/171 |
| 7,300,119 B2* | 11/2007 | Ueno | B62D 55/24 305/165 |
| 2007/0114845 A1* | 5/2007 | Choi | B62D 55/24 305/177 |

(Continued)

FOREIGN PATENT DOCUMENTS

| CN | 101068707 A | 11/2007 |
| CN | 103118930 A | 5/2013 |

(Continued)

OTHER PUBLICATIONS

Sep. 20, 2016, International Search Report issued in the International Patent Application No. PCT/JP2016/003496.

(Continued)

*Primary Examiner* — S. Joseph Morano
*Assistant Examiner* — Jean W Charleston
(74) *Attorney, Agent, or Firm* — Kenja IP Law PC (57) ABSTRACT

Provided is an elastic crawler with improved transmission of the driving force to snow, soft ground, etc. by improving the packing performance during running of the elastic crawler. The elastic crawler 1 comprises: a crawler main body 2 formed into an endless shape with an elastic body; a plurality of cores 3 being embedded in the crawler main body 2 in a manner spaced from each other in the crawler circumferential direction and extending in a crawler width direction; and a plurality of lugs 4, 5 raised from an outer circumferential surface of the crawler main body 2 and respectively surrounding predetermined regions R overlapping the cores 3 in a crawler thicknesswise view.

6 Claims, 7 Drawing Sheets

(58) Field of Classification Search
USPC ........ 305/129, 170, 171, 172, 174, 175, 177
See application file for complete search history.

(56) References Cited

U.S. PATENT DOCUMENTS

| | | | |
|---|---|---|---|
| 2008/0007118 A1 | 1/2008 | Fujita | |
| 2009/0309415 A1* | 12/2009 | Shimozono | B62D 55/244 305/177 |
| 2011/0169324 A1* | 7/2011 | Ijiri | B62D 55/244 305/142 |
| 2018/0194409 A1 | 7/2018 | Tateishi | |

FOREIGN PATENT DOCUMENTS

| | | | |
|---|---|---|---|
| CN | 107848589 A | | 3/2018 |
| JP | S5572469 A | | 5/1980 |
| JP | H0911937 A | | 1/1997 |
| JP | 2000128036 A | | 5/2000 |
| JP | 1220290 S | | 10/2004 |
| JP | 2010012806 A | | 1/2010 |
| JP | 2010052670 A | | 3/2010 |
| JP | 2012096638 A | * | 5/2012 |
| JP | 2012096638 A | | 5/2012 |
| JP | 2012144143 A | * | 8/2012 |
| JP | 2012144143 A | | 8/2012 |

OTHER PUBLICATIONS

Jul. 29, 2019, search result of the Office Action issued by the China National Intellectual Property Administration in the corresponding Chinese Patent Application No. 201680044752.5.

* cited by examiner

ELASTIC CRAWLER

TECHNICAL FIELD

This disclosure relates to an elastic crawler.

BACKGROUND

As a conventional elastic crawler, suggested is one provided with grooves extending in a crawler width direction respectively between cores embedded at a spacing in a circumferential direction of a crawler main body in a crawler thickness-direction view adjacent in the crawler circumferential direction on an outer circumferential surface of the elastic crawler, by disposing a plurality of lugs raised from the outer circumferential surface of the crawler main body in a manner respectively overlapping the cores (see, e.g., JPH09-11937 (PTL1)). These grooves are formed in a manner spaced from each other in the crawler circumferential direction on the outer circumferential surface of the elastic crawler, and thereby contribute to improvement of bendability of the elastic crawler during winding or running of the elastic crawler.

CITATION LIST

Patent Literature

PTL1: JPH09-11937A

SUMMARY

Technical Problem

On the other hand, when running on, e.g., a snowy road, the elastic crawler is capable of improving transmission of a driving force to the snow and suppressing a lateral slip via an effect of a so-called snow column shear force, by compacting and hardening the snow between the plurality of lugs. In this way, a performance for compacting and hardening soft ground such as snow on an inner side between the plurality of lugs (hereinafter referred to as "packing performance" as well) is an important performance of elastic crawlers.

However, the aforementioned conventional elastic crawler has a problem that when running on snow, the snow is not sufficiently compacted and escapes between the cores along the grooves extending in the crawler width direction. Therefore, there is still room for improving the packing performance thereof.

This disclosure aims to provide an elastic crawler with improved transmission of the driving force to snow or soft ground, etc. by improving the packing performance during running of the elastic crawler.

Solution to Problem

The elastic crawler according to this disclosure comprises: a crawler main body formed into an endless shape with an elastic body; a plurality of cores being embedded in the crawler main body in a manner spaced from each other in the crawler circumferential direction and extending in a crawler width direction; and a plurality of lugs raised from an outer circumferential surface of the crawler main body and respectively surrounding predetermined regions overlapping the cores in a crawler thicknesswise view.

The elastic crawler according to this disclosure is capable of improving transmission of the driving force to snow or soft ground, etc. by improving the packing performance.

In the elastic crawler according to this disclosure, it is preferable that the lugs respectively comprise open portions opening the regions in only one direction.

In this case, it is possible to suppress deterioration of the packing performance when the elastic crawler is continuously used.

In the elastic crawler according to this disclosure, it is preferable that the direction in which the open portions open the regions is a direction extending along the crawler width direction.

In this case, it is possible to suppress the lateral slip.

In the elastic crawler according to this disclosure, it is preferable that the direction in which the open portions open the regions is a direction extending along the crawler width direction toward a central side in the crawler width direction.

In this case, it is possible to further improve transmission of the driving force to snow or soft ground, etc., and to further suppress the lateral slip.

In the elastic crawler according to this disclosure, it is preferable that respective two of the lugs surround respective two of the regions spaced from each other in the crawler width direction, and the open portions of the respective two of the lugs opening the regions face each other.

In this case, it is possible to further improve transmission of the driving force to snow or soft ground, etc., and to further suppress the lateral slip.

In the elastic crawler according to this disclosure, it is preferable that the lugs surround the regions in all directions.

In this case, it is possible to improve transmission of the driving force to snow or soft ground, etc. by improving the packing performance.

In the elastic crawler according to this disclosure, it is preferable that some of the lugs surrounding the predetermined regions are central lugs respectively overlapping centers of the cores in the crawler width direction in a crawler thicknesswise view.

In this case, it is possible to further improve the packing performance.

In the elastic crawler according to this disclosure, it is preferable that the lugs respectively extend in a manner overlapping a plurality of the cores adjacent in the crawler circumferential direction in a crawler thicknesswise view.

In this case, it is possible to improve durability of the lugs by increasing the volume of each lug.

In the elastic crawler according to this disclosure, it is preferable that at least one edge of each one of the regions in the crawler circumferential direction is in accordance with at least one edge of each one of the cores in the crawler circumferential direction in a crawler thicknesswise view.

In this case, it is possible to suppress deterioration of the packing performance when the elastic crawler is continuously used.

Advantageous Effect

According to this disclosure, it is possible to provide an elastic crawler with improved transmission of the driving force on snow or soft ground, etc. by improving the packing performance during running of the elastic crawler.

DETAILED DESCRIPTION

In the following, the elastic crawler according to one embodiment of this disclosure is described in detail by referring to the drawings. In the following description, the crawler width direction is represented with a reference sign W, and the crawler circumferential direction is represented with a reference sign L. Furthermore, the crawler thickness direction is represented with a reference sign D. Note that the "crawler width direction" refers to the width direction of the elastic crawler 1, while the width direction of the crawler main body 2 is synonymous thereto. Moreover, the "crawler circumferential direction" refers to the circumferential direction of the elastic crawler 1, while the circumferential direction of the crawler main body 2 is synonymous thereto. Furthermore, the "crawler thickness direction" refers to the thickness direction of the elastic crawler 1, while the thickness direction of the crawler main body 2 is synonymous thereto.

Figure 1:
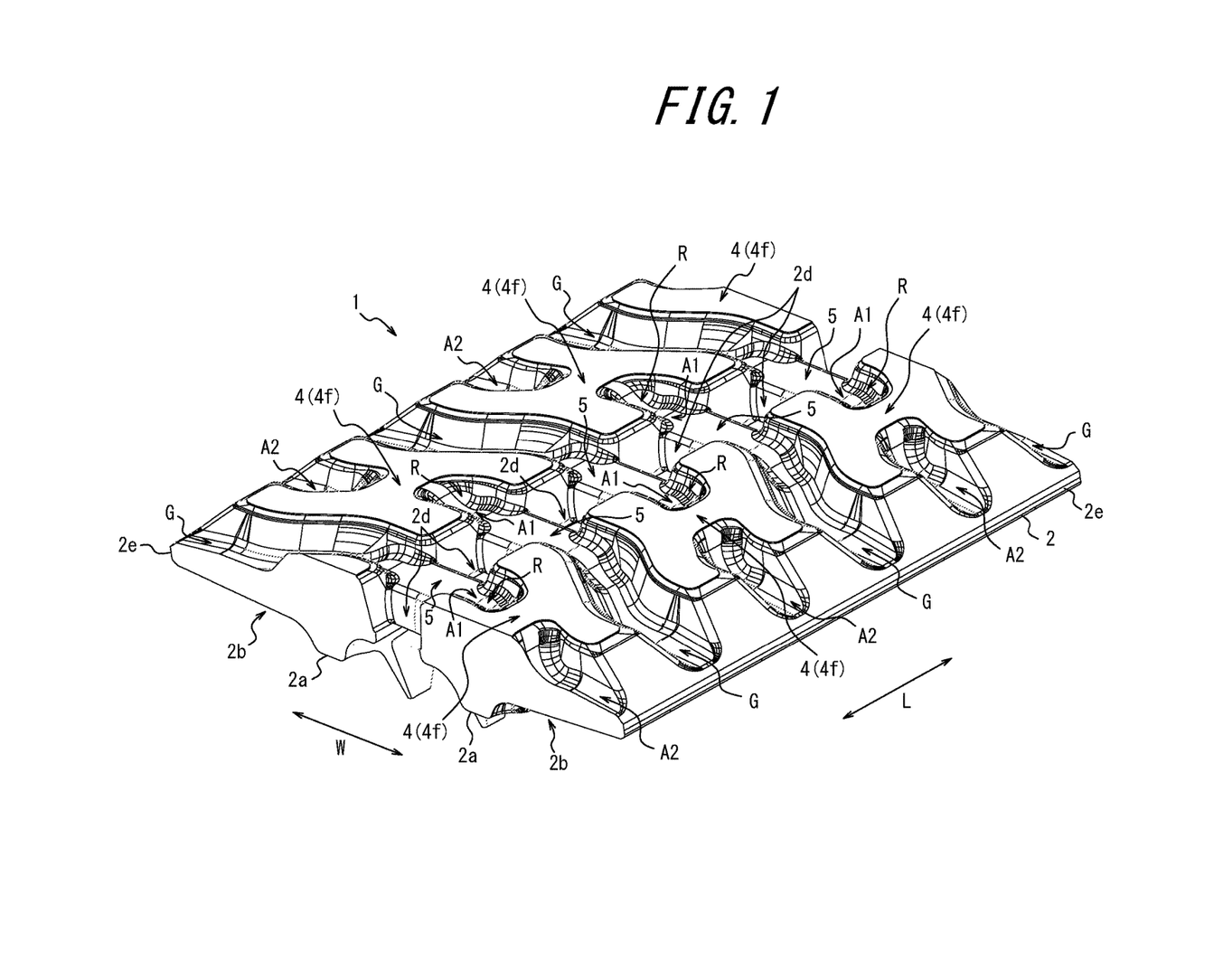
FIG. 1 is a partial perspective view illustrating a partial cross section of an elastic crawler according to one embodiment of this disclosure from an outer circumferential surface side of the elastic crawler.
Figure 2:
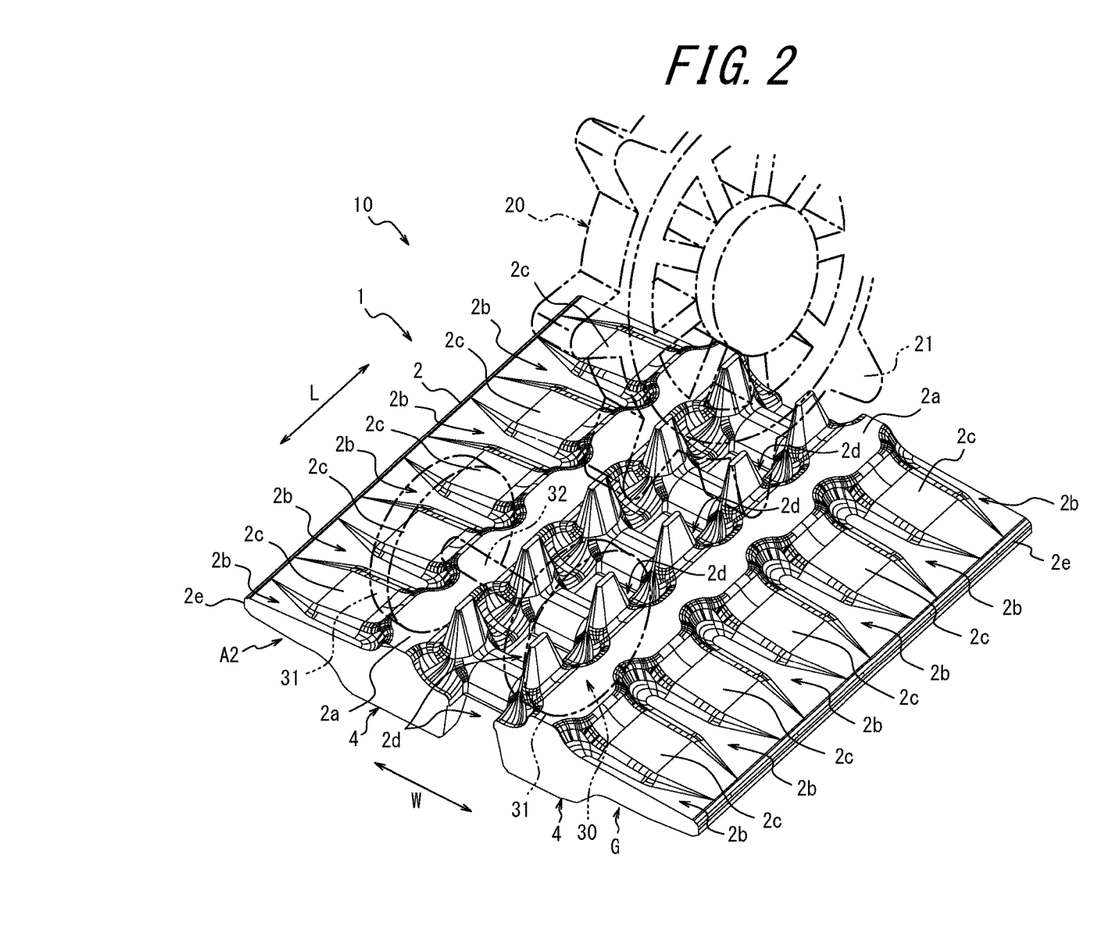
FIG. 2 is a partial perspective view illustrating a partial cross section of the elastic crawler of FIG. 1 together with virtually illustrated sprocket and idler from an inner circumferential surface side of the elastic crawler.

The elastic crawler 1, for example, as illustrated in FIGS. 1 and 2, has a crawler main body 2 formed into an endless shape with an elastic body. The crawler main body 2 is a cyclic member formed into a belt-like shape, with the direction of the reference sign W as the crawler width direction, and the direction of the reference sign L as the crawler circumferential direction. In the present embodiment, the crawler main body 2 is formed of a rubber.

Figure 3:
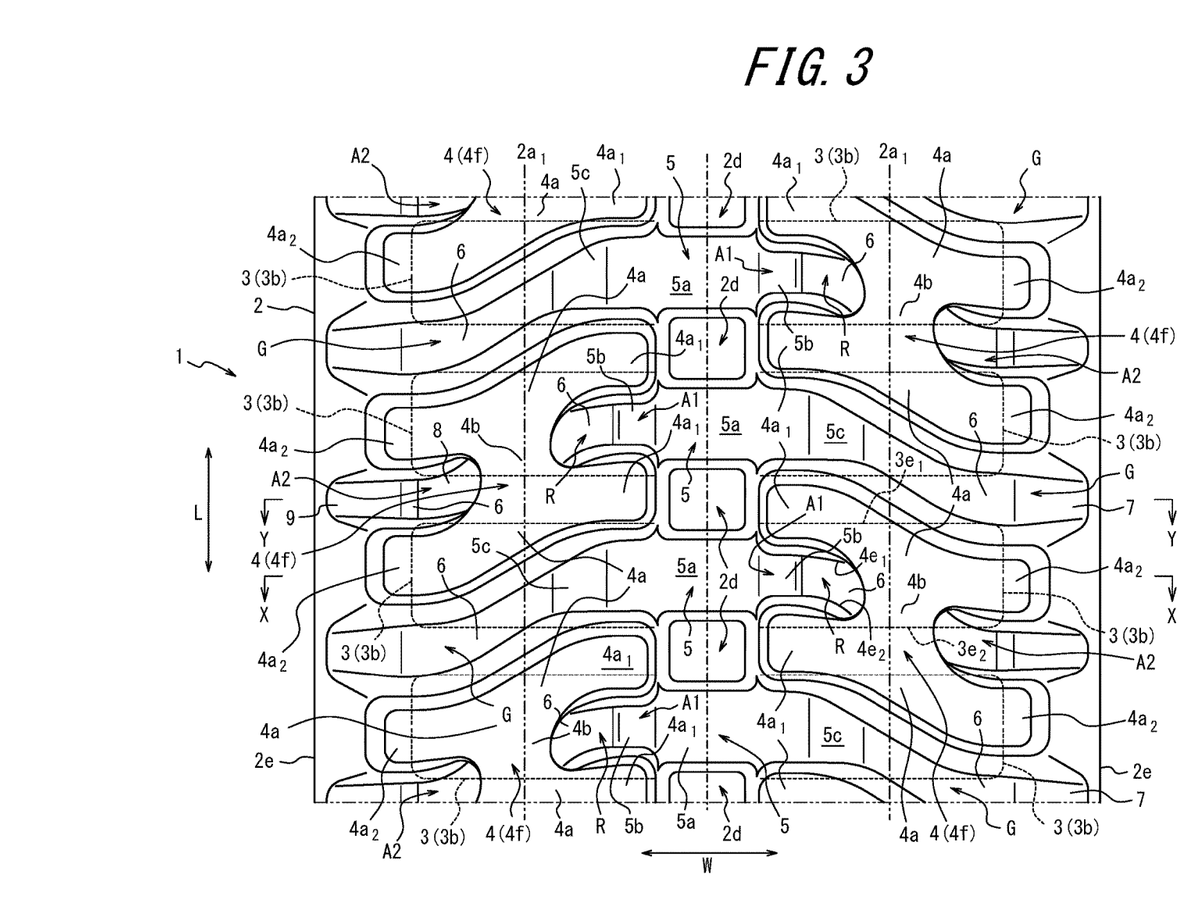
FIG. 3 is a plan view illustrating an outer circumferential surface of the elastic crawler of FIG. 1.
Figure 4:
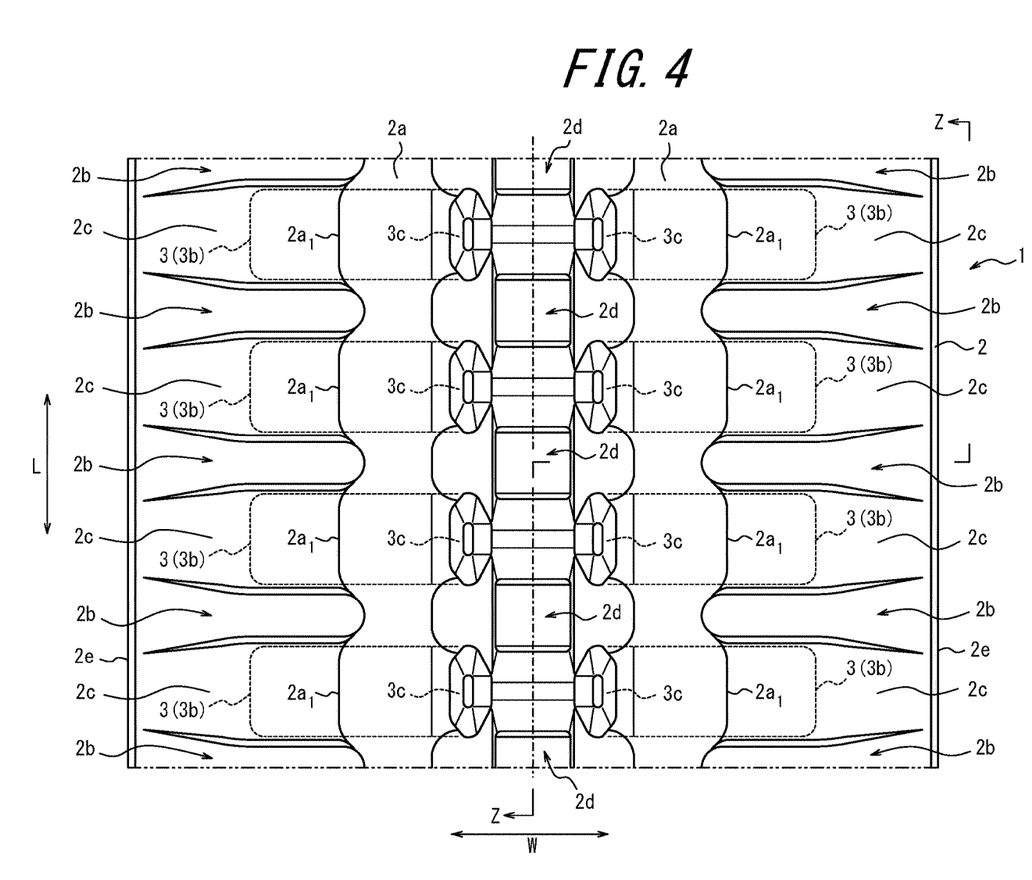
FIG. 4 is a plan view illustrating an inner circumferential surface of the elastic crawler of FIG. 1.
Figure 5:
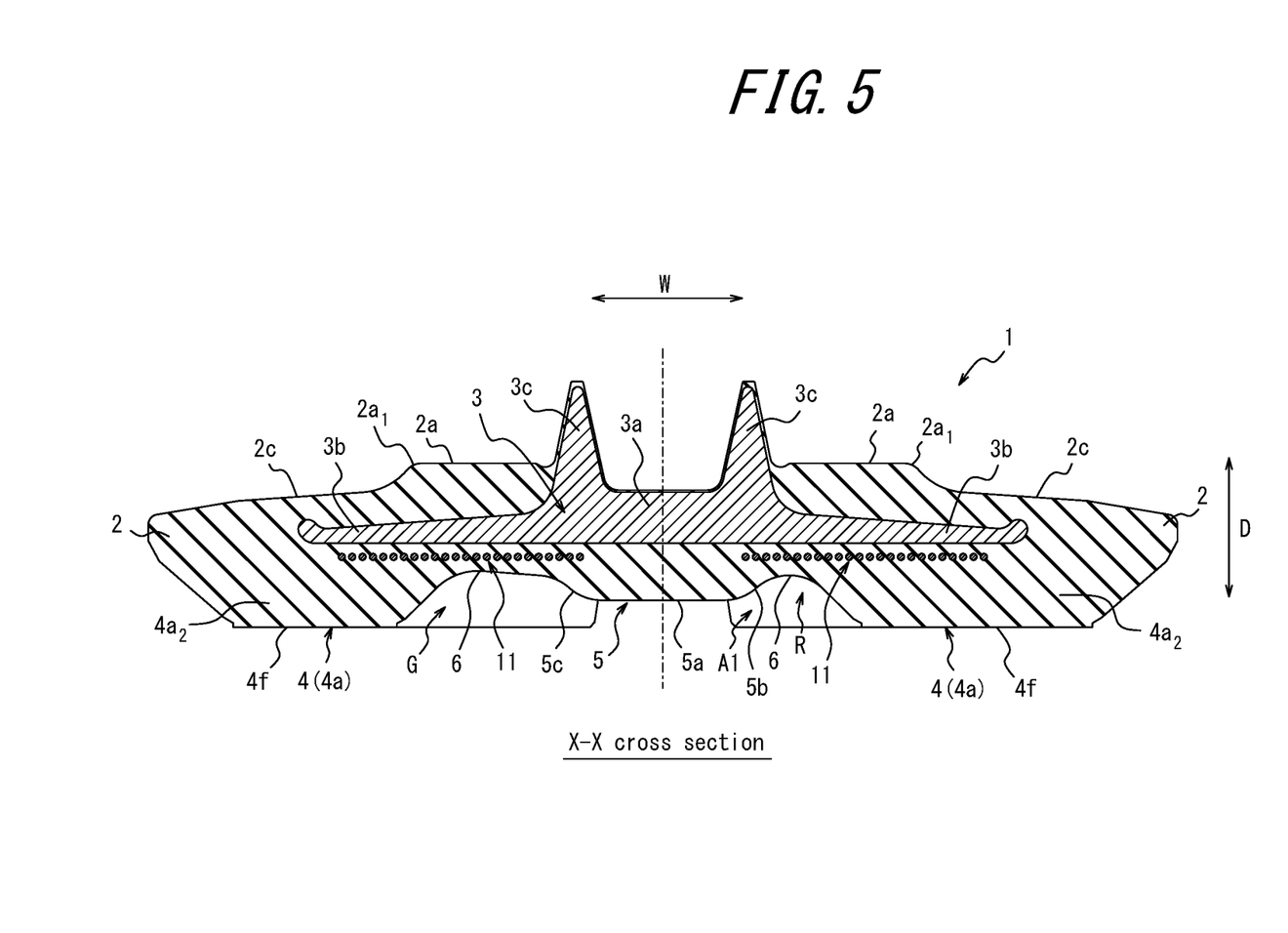
FIG. 5 is an X-X cross-sectional view of FIG. 3.

Moreover, the elastic crawler 1 includes a plurality of cores 3 as illustrated with dashed line in FIGS. 3 and 4. As illustrated in FIGS. 3 and 4, the cores 3 are embedded in the crawler main body 2 in a manner spaced from each other in the crawler circumferential direction, and extend in the crawler width direction. In the present embodiment, as illustrated in FIG. 5, a central portion 3a of each core 3 is located at a center in the crawler width direction. Moreover, each core 3 has a pair of wings 3b extending from a crawler widthwise inner side to crawler widthwise outer sides with the center 3a therebetween. Furthermore, a pair of projections 3c arranged in a manner spaced from each other in the crawler width direction are disposed on the center 3a of each core 3. In the present embodiment, as illustrated in FIG. 5, a main cord layer 11 is arranged on a crawler thicknesswise side outer than the wings 3b of the cores 3 (the outer circumferential surface side of the crawler main body 2). The main cord layer 11 is formed by, for example, arranging a plurality of steel cords running through the crawler main body 2 in the crawler circumferential direction, in a manner spaced from each other in the width direction.

On the other hand, a track roller rolling surface 2a is formed on the inner circumferential surface side of the crawler main body 2. In the present embodiment, track roller rolling surfaces 2a are formed in pairs, one on either side of the center in the crawler width direction, in a manner spaced from each other in the crawler width direction. The track roller rolling surfaces 2a respectively form flat surfaces, which are, for example, as illustrated in FIGS. 2 and 4 to 7, endless flat surfaces extending in the crawler circumferential direction.

Figure 6:
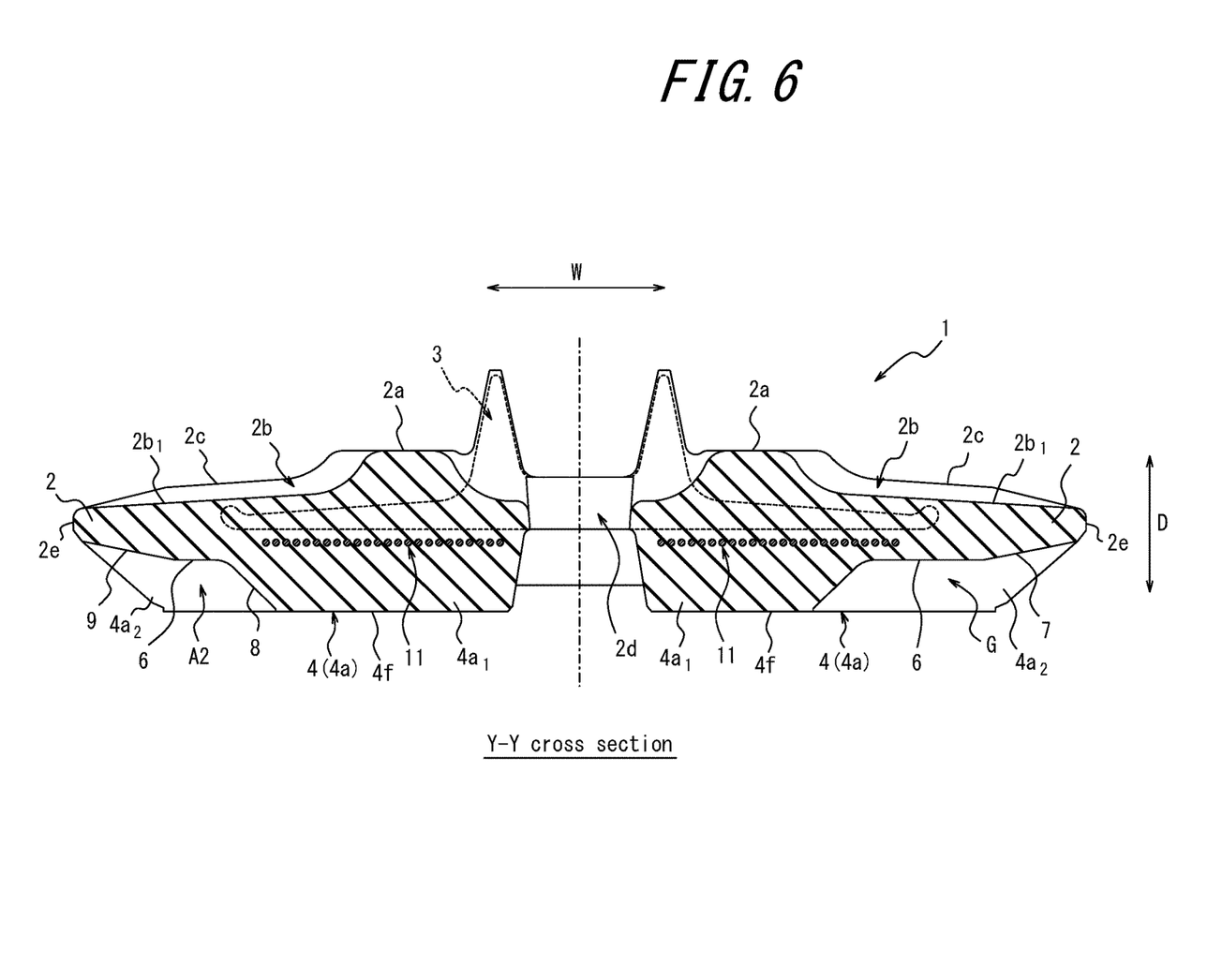
FIG. 6 is a Y-Y cross-sectional view of FIG. 3.
Figure 7:
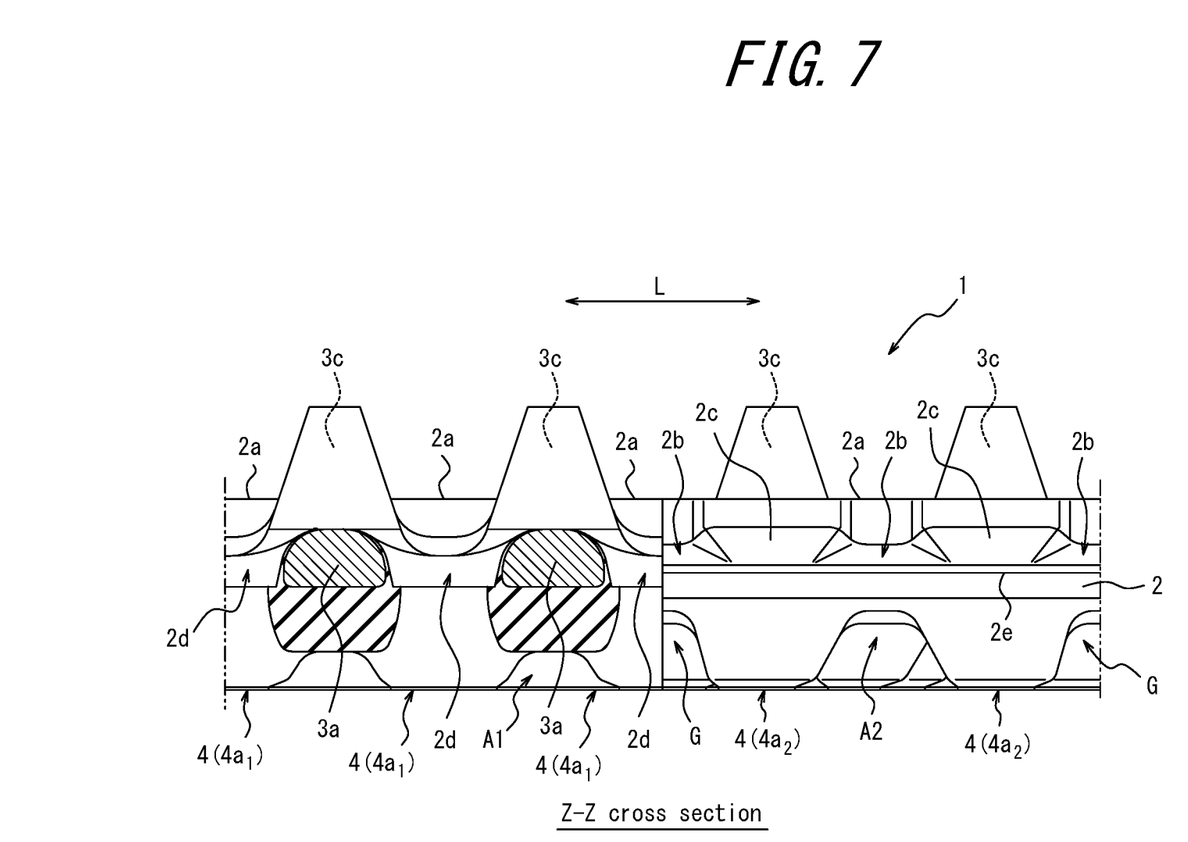
FIG. 7 is a side view illustrating a part of the elastic crawler of FIG. 1 in a Z-Z cross section of FIG. 4.

In the present embodiment, for example, as illustrated in FIG. 4, on the inner circumferential surface side of the crawler main body 2, a plurality of recesses 2b are respectively formed between the wings 3b of the cores 3 adjacent in the crawler circumferential direction. In the present embodiment, the recesses 2b respectively extend from the track roller rolling surfaces 2a to the crawler widthwise outer sides. Specifically, as illustrated in FIG. 4, in a crawler thicknesswise view, the recesses 2b are respectively formed between portions 2c in which the wings 3b of the cores 3 are embedded in the crawler main body 2 (hereinafter referred to as "the core wing-embedded portions" as well) adjacent in the crawler circumferential direction. Moreover, in the present embodiment, as illustrated in FIG. 4, the recesses 2b respectively have a shape with a length along the crawler circumferential direction of the recess 2b (a crawler circumferential width of the recess 2b) increasing toward widthwise edges 2e of the crawler main body 2. Furthermore, in the present embodiment, as illustrated in FIG. 6, a bottom surface $2b_1$ of each one of the recesses 2b is inclined in a manner closer to the outer circumferential surface of the crawler main body 2 toward the widthwise edges 2e of the crawler main body 2 in the crawler thickness direction.

As illustrated in FIG. 4, in the present embodiment, on the inner circumferential surface side of the crawler main body 2, a plurality of engaging portions 2d mentioned below are formed at a widthwise center of the crawler main body 2 in a manner spaced from each other in the crawler circumferential direction. The engaging portions 2d are formed so as to be respectively in a line in the crawler width direction with the recesses 2b formed on the inner circumferential surface side of the crawler main body 2. Namely, the engaging portions 2d are respectively formed at positions corresponding, in the crawler circumferential direction, to the recesses 2b formed on the inner circumferential surface of the crawler main body 2.

The elastic crawler 1 includes, on the outer circumferential surface side of the crawler main body 2, a plurality of lugs raised from the outer circumferential surface of the crawler main body 2 and respectively surrounding predetermined regions R overlapping the cores 3 in a crawler thicknesswise view. Here, "surrounding" is inclusive of not only the case where the regions R are surrounded spanning the entire circumference, but also the case where only one side of the regions R is open. Specific examples include the case where the regions R are surrounded spanning a half or more of the circumference, more specifically, the regions R are surrounded spanning ⅔ or more of the circumference. In the present embodiment, for example, as illustrated in FIGS. 1 and 3, the lugs include: ground-contacting lugs (lugs) 4 arranged on the outer circumferential surface side of the crawler main body 2, and on both sides in the crawler width direction of the centers of the cores 3 in the crawler width direction in a crawler thicknesswise view; and central lugs (lugs) 5 overlapping the centers of the cores 3 in the crawler width direction in a crawler thicknesswise view.

In the present embodiment, the ground-contacting lugs 4 and the central lugs 5 are formed of a rubber. The ground-contacting lugs 4 and the central lugs 5 may be, for example, respectively formed by performing vulcanization adhesion on the outer circumferential surface of the crawler main body 2, or formed integrally with the crawler main body 2. As illustrated in FIG. 3, in the present embodiment, pairs of ground-contacting lugs 4 are respectively arranged, one on either side of the corresponding engaging portion 2d, in a manner spaced from each other in the crawler width direction. Moreover, in the present embodiment, a plurality of ground contacting lugs 4 are arranged in a manner spaced from each other in the crawler circumferential direction. A plurality of gaps (grooves) G extending in the crawler width direction is formed between ground-contacting lugs 4 adjacent in the crawler circumferential direction.

Next, the ground-contacting lugs 4 are described first. Each ground-contacting lug 4 has a pair of widthwise lug portions 4a adjacent in the crawler circumferential direction. The pair of widthwise lug portions 4a are arranged in a manner spaced from each other in the crawler circumferential direction. In FIG. 3, crawler widthwise outermost edges $2a_1$ of the track roller rolling surfaces 2a formed on the inner circumferential surface side of the crawler main body 2 are illustrated with two-dot chain line. Each widthwise lug portion 4a has: an inner end (one end) $4a_1$ overlapping one of the track roller rolling surfaces 2a in the crawler thickness direction; and an outer end (other end) $4a_2$ overlapping the core wing-embedded portion 2c in the crawler thickness direction. Moreover, in the present embodiment, as illustrated in FIG. 3, in a crawler thicknesswise view, the widthwise lug portions 4a have a shape extending in the crawler width direction so as to be displaced in the crawler circumferential direction toward the crawler widthwise outer sides. Thereby, the inner end $4a_1$ and the outer end $4a_2$ of each widthwise lug portion 4a are arranged at positions displaced in the crawler circumferential direction.

In the present embodiment, as illustrated in FIG. 4, the wings 3b of the cores 3 illustrated with dashed line in FIG. 3 are arranged at positions overlapping the core wing-embedded portions 2c in a crawler thicknesswise view, and spaces between the wings 3b of the cores 3 illustrated with dashed line in FIG. 3 in the crawler circumferential direction are arranged at positions overlapping the recesses 2b formed on the inner circumferential surface of the crawler main body 2 in a crawler thicknesswise view.

In the present embodiment, each ground-contacting lug 4 has a connecting lug portion 4b connecting the two widthwise lug portions 4a. The connecting lug portion 4b, for example, as illustrated in FIG. 3, is formed between the widthwise lug portions 4a adjacent in the crawler circumferential direction, and connects these widthwise lug portions 4a. Specifically, in each widthwise lug portion 4a, a part inclusive of the inner end $4a_1$ of the widthwise lug portion 4a is a part closer to the center in the crawler width direction than the connecting lug portion 4b, and a part inclusive of the outer end $4a_2$ of the widthwise lug portion 4a is a part on a crawler widthwise side outer than the connecting lug portion 4b. Thereby, as illustrated in FIG. 3, each ground-contacting lug 4 forms a region R having an open portion A1 partitioned by one connecting lug portion 4b and the part inclusive of the inner ends $4a_1$ of two widthwise lug portions 4a, at a position overlapping one track roller rolling surface 2a and one core 3 in a crawler thicknesswise view. Moreover, each ground-contacting lug 4 forms a notched portion A2 partitioned by the connecting lug portion 4b and the part inclusive of the outer ends $4a_2$ of two widthwise lug portions 4a, at a position overlapping a space between two cores 3 in the crawler circumferential direction in a crawler thicknesswise view. Moreover, in the present embodiment, each one connecting lug portions 4b and two widthwise lug portions 4a are raised to the same height in the crawler thickness direction, so that contact patches 4f of the ground-contacting lugs 4 are constituted as one plane.

Note that in the present embodiment, the open portions A1 formed between the inner sides $4a_1$ of each pair of the widthwise lug portions 4a of the ground-contacting lugs 4 are constituted as gaps respectively narrower in the crawler circumferential direction than the gaps G formed between the ground-contacting lugs 4 in the crawler circumferential direction at the same positions in the width direction of the crawler main body 2, but may be gaps wider than the same as well.

Next, the central lugs 5 are described. In the present embodiment, each central lug 5 overlaps the center of a core 3 in the crawler width direction in a crawler thicknesswise view, and connects the inner ends $4a_1$ of two widthwise lug portions 4a adjacent in the crawler circumferential direction among the ground-contacting lugs 4. Thereby, in the present embodiment, the regions (predetermined regions) R respectively surrounded by the parts inclusive of the inner ends $4a_1$ of the two widthwise lug portions 4a, the connecting lug portions 4b and the central lugs are formed at positions overlapping the cores 3 in a crawler thicknesswise view.

More specifically, in the present embodiment, for example, as illustrated in FIG. 5, when a part of each region R closest to each core 3 in the crawler thickness direction is defined as a bottom surface 6 of the region R, each central lug 5 is raised to a position which is on a side closer to the contact patch 4f of each ground-contacting lug 4 than the bottom surface 6 of the region R and which corresponds to the contact patch 4f of the ground-contacting lug 4 or is closer to the core 3 than the contact patch 4f. A maximum raised surface 5a of each central lug 5 is formed at this position. Moreover, each central lug 5 has an open portion side inclined surface 5b, which is continuous to the maximum raised surface 5a and is closer to each core 3 toward the crawler widthwise outer side. Namely, in the present embodiment, each region R is a region surrounded by the contact patch 4f of each ground-contacting lug 4 and the maximum raised surface 5a of each central lug 5, with the bottom surface 6 as a deepest portion. In particular, with a height lower than the contact patch 4f of the ground-contacting lug 4, the maximum raised surface 5a of the central lug 5 opens only one side of the region R in a crawler thicknesswise view.

In the present embodiment, a direction in which the open portions A1 open the regions R is a direction extending along the crawler width direction, more specifically, a direction extending along the crawler width direction toward a central side in the crawler width direction (the crawler widthwise inner side). In the present embodiment, as illustrated in FIG. 3, each open portion A1 is formed above each core 3 in a crawler thicknesswise view so as to open to the crawler widthwise central side.

In the present embodiment, as illustrated in FIG. 3, the ground-contacting lugs 4 are arranged in pairs, one on either side in the crawler width direction, at positions displaced from each other with respect to the engaging portions 2d formed on the crawler main body 2 at a spacing of two engaging portions 2d in the crawler circumferential direction. Specifically, as illustrated in FIG. 3, the inner end $4a_1$ on one side in the crawler circumferential direction among the inner ends $4a_1$ of the two widthwise lug portions 4a of each ground-contacting lug 4 on the right side of the drawing and the inner end $4a_1$ on the other side in the crawler circumferential direction among the inner ends $4a_1$ of the two widthwise lug portions 4a of each ground-contacting lug 4 on the left side of the drawing are arranged so as to be in a line with each engaging portion 2d of the crawler main body 2 in the crawler width direction.

Specifically, between two engaging portions 2d of the crawler main body 2 adjacent to each other in the crawler circumferential direction, a gap G formed between the ground-contacting lugs 4 adjacent in the crawler circumferential direction and a region R having an open portion A1 are arranged on opposite sides of an engaging portion 2d so as to face each other.

As illustrated in FIG. 5, the gaps G formed between the ground-contacting lugs 4 adjacent to each other in the crawler circumferential direction are respectively continuous to the maximum raised portions 5a of the central lugs 5, and respectively have a gap side inclined surface 5c closer to the cores 3 toward the crawler widthwise outer side. As illustrated in FIG. 5, the gap side inclined surfaces 5c are continuous to the bottom surfaces 6. The gap side inclined surfaces 5c may be inclined at an angle either identical to or different from the open portion side inclined surfaces 5b. As illustrated in FIG. 6, the bottom surfaces 6 of the gaps G are continuous to inclined surfaces 7 inclined in a manner closer to the cores 3 toward the widthwise edges 2e of the crawler main body 2. The gaps G are capable of improving the bendability between the cores 3 in the crawler circumferential direction and reducing running vibration on the crawler widthwise outer sides, while allowing snow, etc. compacted between the ground-contacting lugs 4 to escape to the crawler widthwise outer sides.

Further, as illustrated in FIGS. 3, 6, etc., the notched portions A2 are formed on the crawler widthwise outer sides of the ground-contacting lugs 4. Each of the notched portions A2 of the ground-contacting lugs 4 formed between the pairs of outer ends $4a_2$ of the widthwise lug portions 4a is formed by: a first inclined surface 8 continuous to a contact patch 4f of a ground-contacting lug 4, and inclined in a manner closer to a core 3 from the contact patch 4f toward a widthwise edge 2e of the crawler main body 2; a bottom surface 6 continuous to the first inclined surface 8 and at a height identical to a bottom surface 6 of a region R; and a second inclined surface 9 continuous to the bottom surface 6 and inclined in a manner closer to the core 3 toward the widthwise edge 2e of the crawler main body 2. Moreover, in the present embodiment, the notched portions A2 of the ground-contacting lugs 4 formed between the outer ends $4a_2$ of pairs of widthwise lug portions 4a are open to the crawler widthwise outer sides. The notched portions A2 are constituted as gaps respectively narrower in the crawler circumferential direction than the open portions A1 formed between the inner ends $4a_1$ of the ground-contacting lugs 4 at the same positions in the crawler width direction.

FIG. 2 illustrates a basic configuration of the elastic crawler device 10 according to one embodiment of this disclosure, including the aforementioned elastic crawler 1 as a component. The elastic crawler device 10 includes: the aforementioned elastic crawler 1, and a drive wheel, and idling wheel and a track roller onto which the elastic crawler 1 is wound.

In FIG. 2, the reference sign 20 is a sprocket or an idler constituting the elastic crawler device 10. In the present embodiment, the sprocket 20 constitutes the drive wheel, and the idler 20 constitutes the idling wheel. As illustrated in FIG. 2, the sprocket 20 has teeth 21 engaged with the engaging portions 2d to drive the elastic crawler 1, and the idler 20 is driven by the elastic crawler 1 driven by the sprocket 20. In the present embodiment, the engaging portions 2d are constituted by through holes penetrating the crawler main body 2 in the thickness direction, but may also be cavities without penetrating the crawler main body 2 in the thickness direction.

The reference sign 30 is a track roller constituting the elastic crawler device 10. In the elastic crawler 1, the track roller 30 rotates on the track roller rolling surface 2a formed on the inner circumferential surface of the crawler main body 2. In the present embodiment, the track roller 30 has two rotors 31 connected via a shaft 32.

In the present embodiment, when running on snow, soft ground, etc., as illustrated in FIG. 3, etc., by compacting and hardening the snow or soft ground with the regions R surrounded by the ground-contacting lugs 4 and the central lugs 5, the packing performance is improved, and since the regions R surrounded by the ground-contacting lugs 4 and the central lugs 5 are at the positions overlapping the cores 3 in a crawler thicknesswise view, the snow or soft ground can be compacted in the regions R by the cores 3 together with the load from the vehicle body. In this way, the elastic crawler 1 according to the present embodiment is capable of increasing a force compacting the snow or soft ground with the core 3, and thereby improving the packing performance. Therefore, the elastic crawler 1 according to the present embodiment is capable of improving the packing performance, and improving transmission of the driving force to snow, soft ground, etc.

The elastic crawler 1 according to the present embodiment includes open portions A1 opening the regions R in only one direction. In this case, snow, mud, etc. stuck in the regions R can be easily removed from the open portions A1, or alternatively, snow, mud, etc. stuck in the regions R can be easily removed in response to the lugs 4 deforming relative to the open portions A1, and thus it is possible to suppress deterioration of the packing performance due to continuous use of the elastic crawler 1. In particular, in the present embodiment, by compacting with the regions surrounded by the ground-contacting lugs 4 (the connecting lug portions 4b and the parts inclusive of the inner ends $4a_1$) and the central lugs 5, and compacting with the regions surrounded by the ground-contacting lugs 4 (the connecting lug portions 4b and the parts inclusive of the inner ends $4a_1$), it is possible to further improve the packing performance, and due to movement of the ground-contacting lugs 4 (in particular, the parts inclusive of the inner ends $4a_1$) relative to the open portions A1 formed on the central side in the crawler width direction of the ground-contacting lugs 4, it is possible to remove snow, mud, etc. stuck in the regions R.

In particular, in the elastic crawler 1 according to the present embodiment, the direction in which the open portions A1 open the regions R is the direction extending along the crawler width direction. In this case, it is possible to suppress lateral slip.

In the elastic crawler 1 according to the present embodiment, the direction in which the open portions A1 open the regions R is the direction extending along the crawler width direction toward the central side in the crawler width direction. In this case, since escape of a compacted part to the crawler widthwise outer side is suppressed, compacted snow, etc. is allowed to escape toward the center in the crawler width direction, where the load from the vehicle body is large. Thereby, the packing performance during running is improved, which enables further improvement of transmission of the driving force to snow, soft ground, etc. and further suppression of lateral slip.

Furthermore, according to the present embodiment, in the elastic crawler 1, it is preferable that some of the lugs surrounding the predetermined regions R are central lugs 5 overlapping the centers of the cores 3 in the crawler width direction in a crawler thicknesswise view. In the present embodiment, some of the lugs surrounding the predetermined regions R are central lugs 5 overlapping the centers 3a of the cores 3 in the crawler width direction. In this case, by arranging the central lugs 5 at the centers of the cores 3, the regions R are surrounded by the central lugs 5 which carry the largest load such as the load from the vehicle body, and thus the packing performance may be further improved.

In the elastic crawler 1 according to the present embodiment, it is preferable that the lugs extend spanning a plurality of the cores 3 adjacent in the crawler circumferential direction in a crawler thicknesswise view. In the present embodiment, the two widthwise lug portions 4a of each ground-contacting lug 4 respectively extend spanning a plurality of the cores 3 adjacent in the crawler circumferential direction in a crawler thicknesswise view. In this case, by increasing the volume of each ground-contacting lug 4, and increasing the area of the contact patches 4f of the lugs 4, transmission of the driving force to snow, soft ground, etc. is improved, occurrence of slip on low-friction road such as snowy road is suppressed, and phenomena such as abrasion and rubber chipping are suppressed as well. Namely, it is possible to achieve both the durability of the lugs and the running performance on snow, soft ground, etc.

As illustrated in FIG. 3, etc., the elastic crawler 1 according to the present embodiment includes the lugs surrounding the regions R and the gaps G such that each lug and the corresponding gap face each other across the center in the crawler width direction. In this case, it is possible to improve the packing performance and to simultaneously suppress the running vibration.

As a variation of the elastic crawler 1 according to the present embodiment, it is preferable as well that the elastic crawler 1 comprises lugs and regions R such that respective two of the lugs surround respective two of the regions R spaced from each other in the crawler width direction, where the open portions A1 of the respective two of the lugs opening the regions R face each other. Specifically, two ground-contacting lugs 4 are arranged symmetrically in pairs across the line of symmetry, which is a central line extending in the crawler circumferential direction through the center in the crawler width direction. In this case, the two open portions A1 are arranged in a line in a manner spaced from each other in the crawler width direction, and these open portions A1 are open toward the same central lug 5. In this case, together with the snow in the two regions R facing each other in the crawler width direction, the snow on the maximum raised portions 5a of the central lugs 5 is compacted from the outer sides toward the center in the crawler width direction, so as to be sandwiched in the crawler width direction by the two ground-contacting lugs 4 and the central lugs 5 surrounding the regions R. Therefore, it is possible to further improve transmission of the driving force to snow, soft ground, etc., and to further suppress the lateral slip.

In the present embodiment, as illustrated in FIG. 3, edges 4e1, 4e2 of the regions R in the crawler circumferential direction are respectively located in the crawler circumferential direction between edges 3e1, 3e2 of the cores 3 in the crawler circumferential direction. In this case, in a crawler thicknesswise view, the ground-contacting lugs 4 are located at positions surely overlapping the cores 3, which have a higher rigidity as compared to the elastic body. Therefore, it is possible to compact snow with a stronger force, and to further improve the packing performance. Further, in the elastic crawler 1 according to the present embodiment, it is preferable as well that at least one edge of each region R in the crawler circumferential direction is in accordance with at least one edge of each core 3 in the crawler circumferential direction in a crawler thicknesswise view. In this case, when wound onto the sprocket or the idler of the elastic crawler 1, the ground-contacting lugs 4 are bent centering on the edges 3e1 and 3e2 of the cores 3 in the crawler circumferential direction, and thus dirt, etc. stuck in the regions R can be easily removed. Therefore, it is possible to suppress deterioration of the packing performance due to continuous use of the elastic crawler 1.

In another variation of the elastic crawler 1 according to the present embodiment, it is preferable that the lugs surround the regions R in all directions. As a specific example, the regions R may be surrounded in all directions by the ground-contacting lugs 4 and the central lugs 5 by setting the maximum raised portion 5a of the central lugs 5 at the same height as the contact patches 4f of the ground-contacting lugs 4, or alternatively, the regions R may be surrounded in all directions with only the ground-contacting lugs 4 by using recesses formed on the ground-contacting lugs 4 as the regions R. In this case as well, it is possible to improve transmission of the driving force to snow, soft ground, etc. by improving the packing performance.

According to this disclosure, it is possible to provide an elastic crawler with improved packing performance during running.

As illustrated in FIG. 6, the gaps G and the notched portions A2 formed between the outer ends $4a_2$ of the widthwise lug portions 4a respectively overlap the recesses 2b (in the present embodiment, at least a part of the recesses 2b in the width direction of the crawler main body 2) formed on the inner circumferential surface of the crawler main body 2 in the thickness direction of the crawler main body 2, and locally reduces the thickness of the crawler main body 2. Thereby, the gaps G and the notched portions A2 respectively collaborate with the recesses 2b formed on the inner circumferential surface of the crawler main body 2 to allow the elastic crawler 1 to easily bend to a sufficient extent. Moreover, as illustrated in FIG. 6, the inner ends $4a_1$ of each widthwise lug portion 4a (in the present embodiment, at least a part of the inner ends $4a_1$ in the width direction of the crawler main body 2) overlap the track roller rolling surfaces 2a in the thickness direction of the crawler main body 2. Thereby, as illustrated in FIG. 6, the inner portions $4a_1$ of the widthwise lug portions 4a respectively support the track roller rolling surfaces 2a.

In the elastic crawler 1 according to the present embodiment, the plurality of recesses 2b are formed on the inner circumferential surface of the crawler main body 2, the recesses 2b extending between the wings 3b of the cores 3 adjacent in the circumferential direction from the track roller rolling surfaces 2a toward the widthwise outer sides of the crawler main body 2. The recesses 2b are respectively formed in a manner spaced from each other in the circumferential direction, in parts without existence of the cores 3 extending in the width direction of the crawler main body 2. Furthermore, on the outer circumferential surface of the crawler main body 2, the plurality of widthwise lug portions 4a are formed, the widthwise lug portions 4a extending in the width direction of the crawler main body 2 between the cores 3 adjacent in the circumferential direction, from the inner ends $4a_1$ overlapping the track roller rolling surfaces 2a in the thickness direction of the crawler main body 2 toward the outer ends $4a_2$ overlapping the parts in which the wings 3b of the cores 3 are embedded in the thickness direction of the crawler main body 2.

Namely, in the elastic crawler 1 according to the present embodiment, between the cores 3 adjacent in the circumferential direction, in other words, in the parts without existence of the cores 3 extending in the width direction of the crawler main body 2, the inner ends $4a_1$ of the widthwise lug portions 4a are arranged on the widthwise inner sides of the crawler main body 2, while some of the gaps G formed between the outer ends $4a_2$ of the widthwise lug portions 4a adjacent in the circumferential direction, i.e., between the ground-contacting lugs 4 adjacent in the circumferential direction, are arranged on the widthwise outer sides of the crawler main body 2 (inclusive of the notched portions A2 formed by the connecting lug portions 4b in the present embodiment).

In this case, on the widthwise outer sides of the crawler main body 2, by arranging the gaps G and the notched portions A2 shaped by the widthwise lug portions 4a formed on the outer circumferential surface of the crawler main body 2 at positions overlapping the recesses 2b formed on the inner circumferential surface of the crawler main body 2 in the thickness direction of the crawler main body 2, the crawler main body 2 (the elastic crawler 1) is allowed to bend easily when the elastic crawler 1 is driven, and thus it is possible to reduce the power loss during running, and to improve the fuel efficiency. Moreover, on the widthwise inner side of the crawler main body 2, by arranging the inner ends $4a_1$ of the widthwise lug portions 4a at the positions overlapping the recesses 2b formed on the inner circumferential surface of the crawler main body 2 in the thickness direction of the crawler main body 2, the elastic crawler 1 is allowed to bend easily, and the spring becomes stiffer at positions between cores 3 adjacent in the circumferential direction (in the parts in which the inner ends $4a_1$ of the widthwise lug portions 4a are arranged, the difference in spring force between each core wing-embedded portion 2c and the space between the core wing-embedded portions 2c is reduced). Thereby, the vibration during running is suppressed, which improves the ride comfort.

Therefore, the elastic crawler 1 according to the present embodiment is capable of achieving both reduction of bending resistance of the elastic crawler 1 and suppression of the vibration, and thus is capable of achieving both low fuel consumption and excellent ride comfort.

According to the elastic crawler 1 according to the present embodiment, due to the connecting lugs 4b being formed between the widthwise lug portions 4a adjacent in the circumferential direction and connecting the widthwise lug portions 4a, as compared to the case of providing only one widthwise lug portion 4a for each lug, the volume of each lug is increased, and thus it is possible to improve the durability of the lugs.

In particular, the elastic crawler 1 according to the present embodiment includes the connecting lug portions 4b, so as to form the notched portions A2 formed by the widthwise lug portions 4a adjacent in the circumferential direction and the connecting lug portions 4b at the positions overlapping the recesses 2b formed on the inner circumferential surface of the crawler main body 2 in the thickness direction of the crawler main body 2. In this case, since the notched portions A2 formed on the ground-contacting lugs 4 adjacent in the circumferential direction exist as the gaps G formed between the widthwise lug portions 4a adjacent in the circumferential direction, and overlap the recesses 2b formed on the inner circumferential surface of the crawler main body 2 in the thickness direction of the crawler main body 2, the rigidity of the widthwise lug portions 4a is improved as the rigidity of the entire ground-contacting lugs 4, and the crawler main body 2 (the elastic crawler 1) is allowed to bend easily. Thereby, it is possible to improve the durability of the lugs, and to simultaneously further reduce the fuel consumption.

The elastic crawler 1 according to the present embodiment includes the connecting lug portions 4b, so as to form the open portions A1 formed by the widthwise lug portions 4a adjacent in the circumferential direction and the connecting lug portions 4b at the positions overlapping the track roller rolling surfaces 2a formed on the inner circumferential surface of the crawler main body 2 and the cores 3 in the thickness direction of the crawler main body 2. In this case, it is possible to reduce the difference in spring force between the parts in which the cores 3 are embedded and the parts without existence of the cores 3, and thus it is possible to improve the durability of the lugs, and to simultaneously improve the ride comfort.

The elastic crawler device 10 according to the present embodiment is capable of achieving both low fuel consumption and excellent ride comfort.

As mentioned above, this disclosure is capable of providing an elastic crawler and an elastic crawler device capable of achieving both low fuel consumption and excellent ride comfort.

The above is merely one of many possible embodiments of the present disclosure and may be changed in a variety of manners within the scope of the claims. For example, as long as the regions R are at the positions overlapping the cores 3 in a crawler thicknesswise view, the direction in which the open portions A1 of the ground-contacting lugs 4 open the regions R may be either the direction extending along the crawler width direction toward the outer side in the crawler width direction or a direction extending along the crawler circumferential direction (inclusive of a direction inclined with respect to the crawler circumferential direction).

INDUSTRIAL APPLICABILITY

This disclosure may be used in an elastic crawler with lugs raised from an outer circumferential surface of a crawler main body.

REFERENCE SIGNS LIST 1 elastic crawler
2 crawler main body
2a track roller rolling surface
2b recess
2c part in which wing of core is embedded
3 core
3a center
3b wing
3e1 edge of core in crawler circumferential direction
3e2 edge of core in crawler circumferential direction
4 ground-contacting lug (lug)
4a widthwise lug portion (lug)
$4a_1$ inner end (lug)
$4a_2$ outer end (lug)
4b connecting lug portion (lug)
4e1 edge of region in crawler circumferential direction
4e2 edge of region in crawler circumferential direction
5 central lug (lug)
5a maximum raised surface
5b open portion side inclined surface
5c gap side inclined surface
10 elastic crawler device
A1 open portion
A2 notched portion D crawler thickness direction
L crawler circumferential direction
R region
W crawler width direction

The invention claimed is:

1. An elastic crawler comprising:
a crawler main body formed into an endless shape with an elastic body;
a plurality of cores being embedded in the crawler main body in a manner spaced from each other in a crawler circumferential direction and extending in a crawler width direction;
a plurality of lugs raised from an outer circumferential surface of the crawler main body and respectively surrounding predetermined regions overlapping the cores in a crawler thicknesswise view, and wherein
the plurality of lugs respectively comprise open portions opening the regions in only one direction, the one direction extending along the crawler width direction toward a central side in the crawler width direction, and the regions being partitioned by inner ends of two widthwise lug portions of the plurality of lugs and a connecting lug portion, the connecting lug portion connecting the two widthwise lug portions.

2. The elastic crawler according to claim 1, wherein:
respective two of the lugs surround respective two of the regions spaced from each other in the crawler width direction, and
the open portions of the respective two of the lugs opening the regions face each other.

3. The elastic crawler according to claim 1, wherein:
the lugs surround the regions in all directions.

4. The elastic crawler according to claim 1, wherein:
some of the lugs surrounding the predetermined regions are central lugs respectively overlapping centers of the plurality of cores in the crawler width direction in the crawler thicknesswise view.

5. The elastic crawler according to claim 1, wherein:
the lugs respectively extend in a manner overlapping a plurality of the cores adjacent in the crawler circumferential direction in the crawler thicknesswise view.

6. The elastic crawler according to claim 1, wherein:
at least one edge of each of the regions in the crawler circumferential direction matches at least one edge of each of the cores in the crawler circumferential direction in the crawler thicknesswise view.

* * * * *